United States Patent
Delitz

(10) Patent No.: US 9,039,354 B2
(45) Date of Patent: May 26, 2015

(54) SEAL FOR A CONTROL DEVICE OF A SUPERCHARGER WITH VALVE MEANS IN THE FORM OF A WASTE GATE

(75) Inventor: Joachim Siegfried Delitz, Heddesbach (DE)

(73) Assignee: IHI CHARGING SYSTEMS INTERNATIONAL GMBH, Heidelberg (DE)

( * ) Notice: Subject to any disclaimer, the term of this patent is extended or adjusted under 35 U.S.C. 154(b) by 527 days.

(21) Appl. No.: 13/459,148

(22) Filed: Apr. 28, 2012

(65) Prior Publication Data

US 2012/0228833 A1      Sep. 13, 2012

Related U.S. Application Data

(63) Continuation-in-part of application No. PCT/EP2010/005687, filed on Sep. 16, 2010.

(30) Foreign Application Priority Data

Nov. 26, 2009   (DE) .......................... 10 2009 055 865

(51) Int. Cl.
   *F01D 17/14*   (2006.01)
   *F01D 17/20*   (2006.01)
   *F02C 6/12*    (2006.01)

(52) U.S. Cl.
   CPC . *F01D 17/20* (2013.01); *F02C 6/12* (2013.01); *F05D 2240/55* (2013.01)

(58) Field of Classification Search
   CPC ......... F01D 17/12; F01D 17/14; F01D 17/20; F01D 17/105; F01D 17/141
   See application file for complete search history.

(56) References Cited

U.S. PATENT DOCUMENTS

| 2,860,827 | A   | 11/1958 | Egli |
| 6,210,106 | B1  | 4/2001  | Hawkins |
| 7,134,836 | B2* | 11/2006 | Scherrer ........................ 415/112 |
| 7,644,583 | B2* | 1/2010  | Leavesley ....................... 60/602 |
| 8,579,579 | B2* | 11/2013 | Castan et al. .................. 415/160 |

FOREIGN PATENT DOCUMENTS

| DE | 20 2005 008 606 | 9/2005 |
| EP | 1 426 563       | 6/2004 |
| EP | 1 895 106       | 3/2008 |
| WO | WO 02/059462    | 8/2002 |

* cited by examiner

*Primary Examiner* — Edward Look
*Assistant Examiner* — Jason Davis
(74) *Attorney, Agent, or Firm* — Klaus J. Bach

(57) ABSTRACT

In a sealing arrangement for an control device of a charging device which sealing arrangement includes a bearing bushing in which an control shaft is rotatably supported by the bushing in a housing opening of the charging device, the control shaft is provided with a collar disposed in the housing opening at an axial end of the bushing and the collar includes a groove accommodating a seal ring which is in direct contact with the wall of the opening for sealing the shaft supported in the bushing directly with respect to the opening wall.

4 Claims, 3 Drawing Sheets

SEAL FOR A CONTROL DEVICE OF A SUPERCHARGER WITH VALVE MEANS IN THE FORM OF A WASTE GATE

This is a Continuation-In-Part application of pending international patent application PCT/EP2010/005687 filed Sep. 16, 2010 and claiming the priority of German patent application 10 2009 055 865.9 filed Nov. 26, 2009.

BACKGROUND OF THE INVENTION

The invention relates to a seal for a control device of a supercharger, in particular for an exhaust gas turbocharger with a valve means in the form of a waste gate, with a bearing element supporting a control shaft.

Control devices of this type are well known. DE 20 2005 008 606 U1 discloses for example a control shaft arrangement of a turbocharger with a variable turbine geometry or with a waste gate, respectively, which includes a control shaft provided with a mounting section. The control shaft arrangement also includes a lever which is connected to the control shaft via the mounting section, and a bushing which is arranged on a base body of the control shaft. In addition, a seal is provided which is arranged in the area of the base body between the bushing and the control shaft, with the base body of the control shaft having a stepped outer contour and the bushing having an inner contour which is formed complementarily to the shape of the base body.

Sealing of the control shaft arrangement by means of the seal which is positioned between the control shaft and the bushing has the drawback that the control shaft comprises a groove which corresponds to the seal and which results in a weakening of the control shaft. This presents a problem insofar as the control shaft is subjected to high temperatures, which leads to an increased failure probability of the shaft and the control device because the shaft is weakened by the groove. Moreover, the installation of the seal is extremely laborious and therefore involves high expenditures with respect to time and cost.

Another problem may occur by the fact that the bushing needs to be sealed with respect to a housing which accommodates the bushing, and which may cause undesired gas leakage.

It is therefore the principal object of the present invention to provide a seal for a control device of a supercharger in an exhaust gas turbocharger with a valve means in the form of a waste gate, which provides for improved and simple sealing.

SUMMARY OF THE INVENTION

In a sealing arrangement for a control device of an exhaust gas turbocharger which device includes a bearing bushing in which a control shaft is rotatably supported by the bushing in a housing opening of the charging device, the control shaft is provided with a collar disposed in the housing opening at an axial end of the bushing and the collar includes a groove accommodating a seal ring which is in direct contact with the opening wall for sealing the shaft supported in the bushing directly with respect to wall of the opening.

The arrangement of the sealing element in the mentioned area provides the possibility to seal the control device direct in the radial direction of the control shaft between it and the housing, whereby gas leakage, not only between the control shaft and the housing but also, in particular, between the control shaft and the bearing element is precluded.

It should be noted that the sealing element is arranged in an area of the control shaft which, as described, projects beyond the bearing element in the axial direction, but which is still surrounded by the housing in which the control shaft is to be supported via the bearing element, so that a sealing contact between the sealing element which is arranged on the control shaft and the housing is possible.

The inventive control device is further advantageous in that the installation of the sealing element may be carried out easily and thus rapidly, which is most beneficial in terms of total cost of the control device.

In an advantageous embodiment of the invention, the control shaft comprises a collar in said area, i. e. a projection which extends in the radial direction of the control shaft on which the sealing element is arranged. This is advantageous in that the already described advantageous direct sealing between the control shaft and the device housing is ensured and, at the same time, weakening of the shaft e. g. by a reduction of its cross-sectional area by the groove which accommodates the sealing element is avoided.

Such an accommodating means, e. g. in the form of a groove, may then be cut into the collar of the control shaft in order to ensure a reliable seating of the sealing element i. e. a sealing ring, without any weakening of the control shaft.

This arrangement results in a reduction of the probability of failure of the control device, because, without weakening of the shaft, it will be capable of withstanding high loads and, in particular, high temperatures over an extended operating life.

To improve the sealing effect between the control shaft and the housing even further, it the sealing element extends axially over a portion of the collar in radial contact with the device housing. This is realized i. e. by an essentially L-shaped configuration of the sealing element which thus engages a corresponding groove with one leg of the L-shape and another leg extending around, and superimposing, the collar in radial direction (32) so as to be in contact with the surrounding housing wall.

In this way, a large-area sealing contact is realized or may be realized, respectively, both between the sealing element and the collar and thus the control shaft, and also between the sealing element and the housing, which is beneficial for a reliable sealing of the control device to prevent gas leakage, i. e. the escape of exhaust gas, for example, from a turbine of an exhaust gas turbocharger.

The inventive control device may, for example, be employed together with an exhaust gas turbocharger, for operating by means of the control device e. g. a valve means, in particular, a waste gate.

Thus, the inventive control device as well as the inventive exhaust gas turbocharger achieves the minimization if not the prevention of leakage, in particular, of exhaust gas leakage, at the interface between the control shaft, the bearing element and the housing. This enables the compliance with current and future emission regulations for vehicles, in particular, motor vehicles with internal combustion engines. This is the case, because partially at present as well as, in particular, in the future, not only emissions will be considered which flow, e. g. from corresponding exhaust outlets of the motor vehicle but the total emissions which are emitted from a corresponding motor vehicle. That would also include a corresponding leakage at the described interface. Such leakage, however, is prevented by the inventive control device since an uncontrollable discharge at said interface is no longer possible. Rather, the exhaust gas of the internal combustion prime movers may be conveyed in its entirety in a controlled manner to corresponding exhaust gas purification devices where it is cleaned and in the cleaned condition is finally discharged into the environment. This keeps the contaminant emissions of the corresponding motor vehicle on a very low level.

The invention will become derived more readily apparent from the following description of a preferred exemplary embodiment with reference to the accompanying drawings. The features and feature combinations as previously mentioned in the description as well as the features and feature combinations which will be mentioned in the following description of the figures are not only applicable in the respective indicated combination but also in other combinations or isolated, without deviating from the scope of the invention.

DETAILED DESCRIPTION OF AN EXEMPLARY EMBODIMENT

Figure 1:
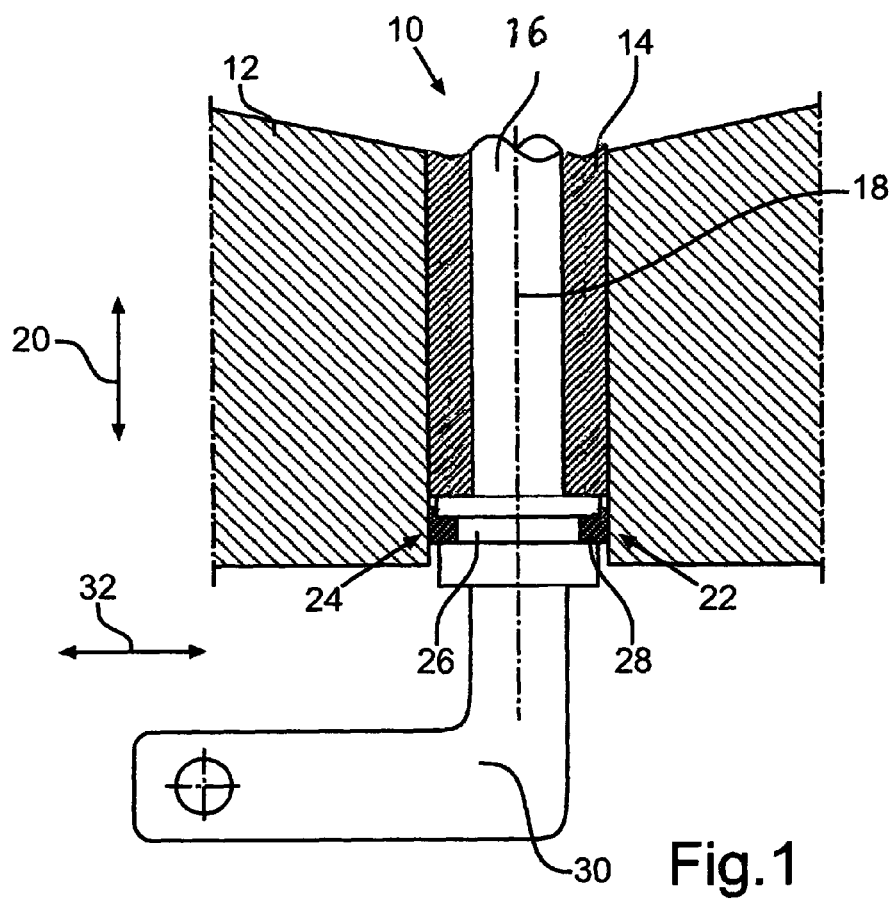
FIG. 1 shows a in a longitudinal sectional view an embodiment the inventive control device which is accommodated in a housing of an exhaust gas turbocharger.

FIG. 1 shows a control device 10 for a charging device which is accommodated in a housing 12 of an exhaust gas turbocharger, with the housing 12 being a turbine casing which accommodates a turbine wheel of a turbine of the exhaust gas turbocharger.

The control device 10 comprises a bearing element in the form of a bushing 14, in which a control shaft 16 of the control device 10 is accommodated. As may be seen from FIG. 1, the control shaft 16 is supported in the housing 12 rotatably about an axis of rotation 18 by means of the bushing 14.

The control shaft 16 comprises a portion 22 which extends, in accordance with a direction arrow 20, beyond the bushing 14 in the axial direction of the control shaft 16, and which forms a collar 24 of the control shaft 16.

The collar 24 comprises a groove 26 in which a corresponding sealing element in the form of a sealing ring 28 is disposed, so that the sealing ring 28 is arranged on the collar 24 of the control shaft 16 outside the bushing 14.

As may be seen, this provides for direct sealing between the housing 12 and the control shaft 16, which prevents leakage to the environment, that is discharge of the exhaust gas conducted from the engine to an exhaust gas turbine via spaces between the bushing 14 and the housing and also between the control shaft 16 and the bushing 14.

At the same time, the arrangement of the sealing ring 28 on the collar 24 in the portion 22 of the control shaft 16 shown in FIG. 1 does neither reduce the cross-sectional area of the control shaft 16 per se, nor weaken the shaft, so that the shaft may withstand high loads, in particular high temperatures, also over a very long life.

The control shaft 16 also comprises an actuating part 30 via which, for example, a valve means, in particular a waste gate, of the turbine may be operated.

The sealing ring 28 may be formed essentially L-shaped with one leg being received in the groove 26 of the control shaft 16 and the other extending into the space between the collar 24 and the housing 12, which provides for a large-area sealing contact between the sealing ring 28 and the housing 12 as well as some sort of a labyrinth seal between the sealing ring 28 the collar 24, which is of particular benefit for the sealing effect.

Figure 2:
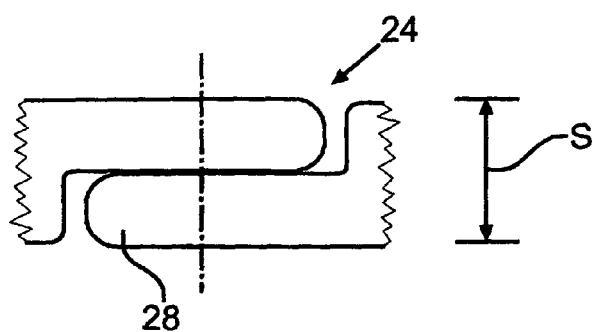
FIG. 2 shows in an enlarged view a detail of a portion of the control device according to FIG. 1.

In place of a closed-ring sealing element an open-end sealing element may also be used, in which the ends are both L-shaped and overlap each other in circumferential direction of the collar 24 as shown in FIG. 2. The axial extension S of the sealing element 28 amounts to e.g. 2 mm.

In lieu of an essentially L-shaped overlap of the ends of the sealing element 28, an oblique surface abutment of the ends of the sealing element 28 is possible which also provides for a very good sealing effect.

Figure 3:
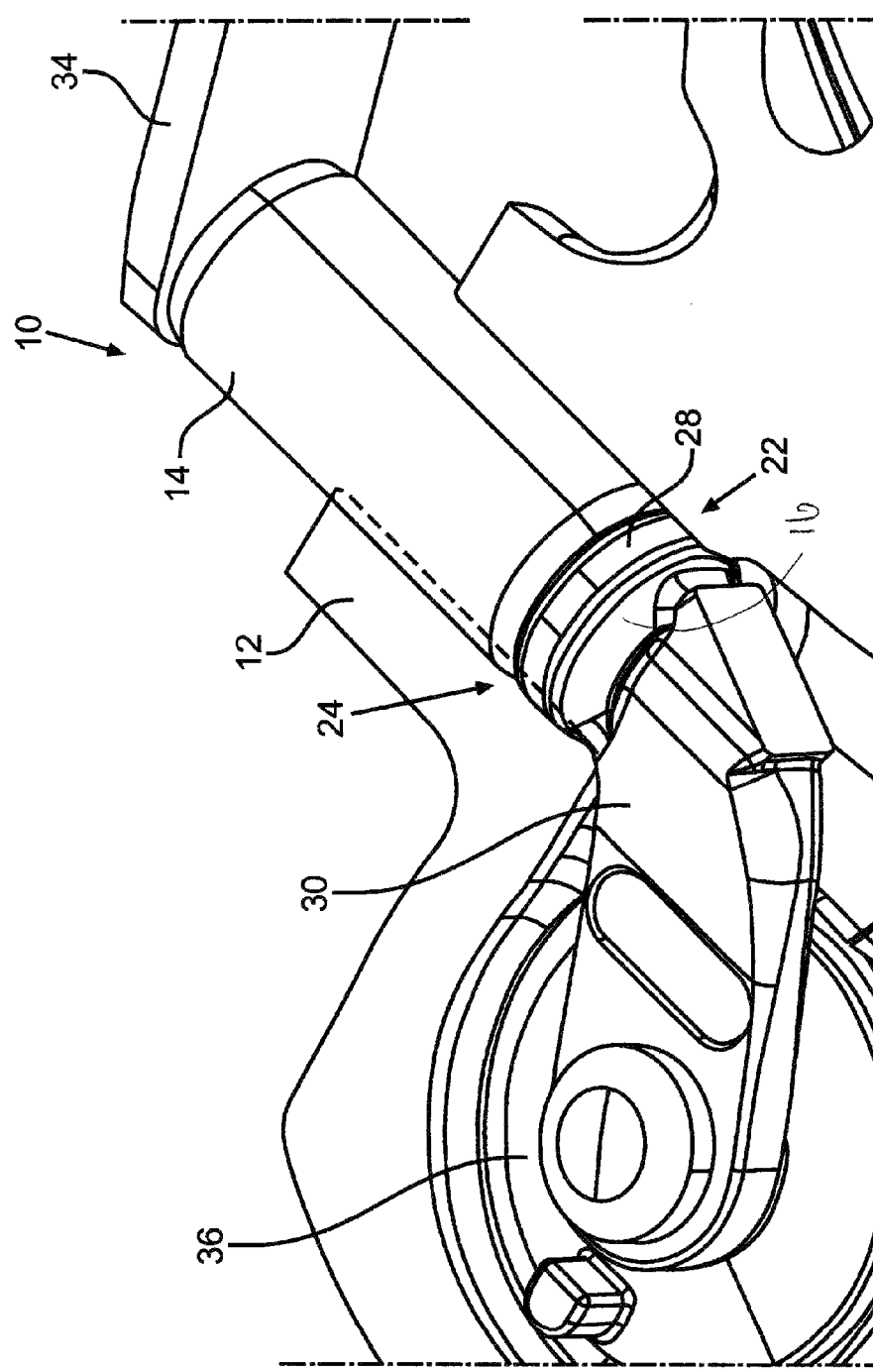
FIG. 3 is a perspective view of the control device according to the previous figures.

FIG. 3 shows the control device 10, with the control shaft 16 disposed in the sleeve 14 being connected to an actuating lever 34, which again may be operated by means of an actuator, for rotating the control shaft 16 about the axis of rotation 18 (FIG. 1).

Figure 4:
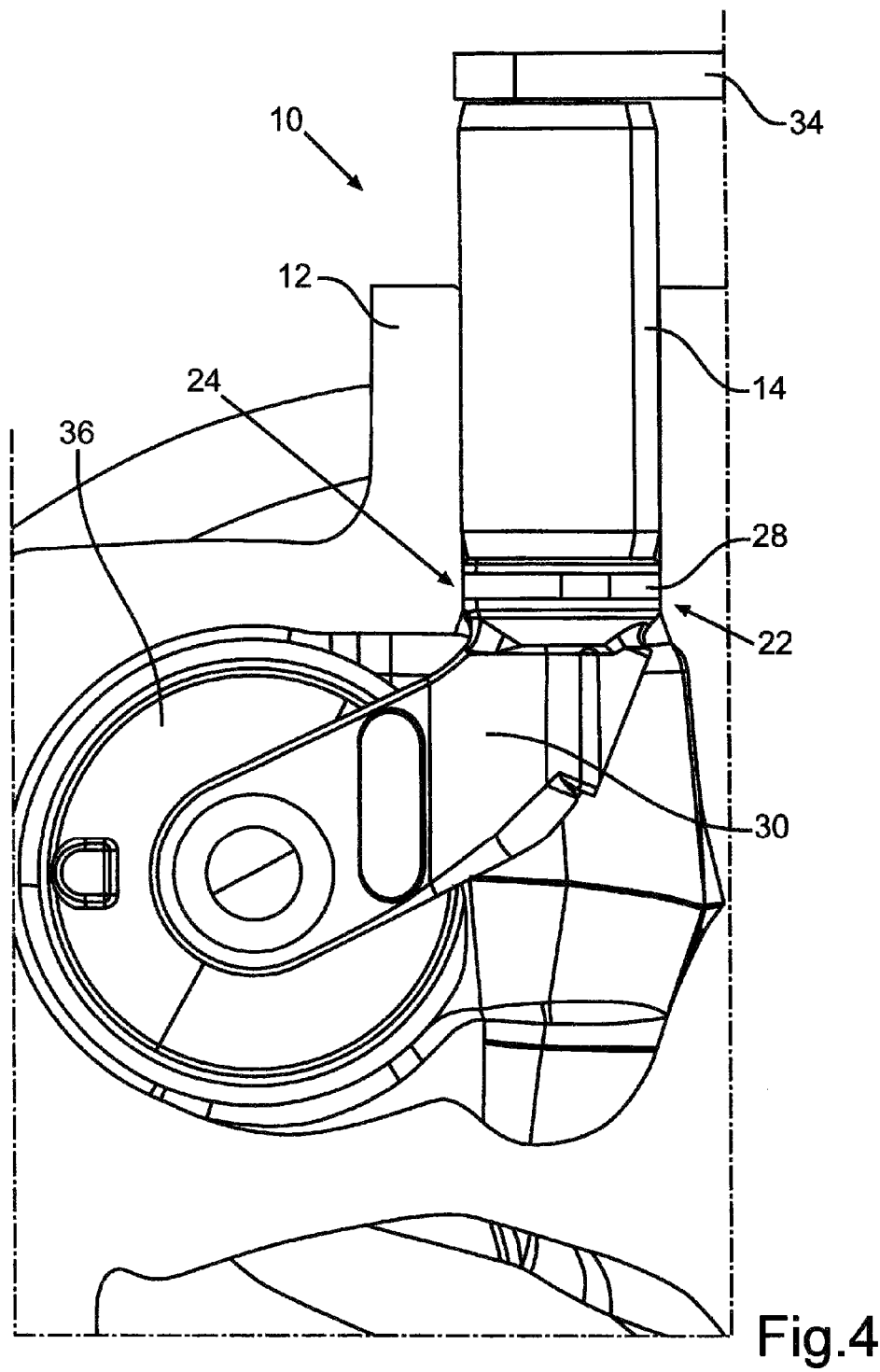
FIG. 4 shows a plan view of the control device according to the previous figures.

FIG. 3 also illustrates a valve means 36 which is connected to an actuating arm 30. As may be seen from FIGS. 3 and 4, the rotation of the control shaft 16 causes opening or closing, respectively, of the valve means 36 by the operation of the actuating lever 34, which, for example, may limit the charging pressure of the exhaust gas turbocharger.

What is claimed is:

1. A sealing arrangement for a control device (10) for operating a valve (36) of an exhaust gas turbocharger, the control device (10) including an operating shaft (16) rotatably supported in an opening of a housing (12) via a bearing bushing (14) which extends only partially through the opening of the housing (12) so as to provide at one end of the bushing (14) an area (22) in which an operating shaft collar (24) with a circumferential groove (26) is arranged and a seal element (28) is disposed in the groove (26) between the operating shaft collar (24) and a surrounding wall area of the opening adjacent the bushing (14) for sealing the operating shaft (16) directly against the surrounding wall of the opening in the area (22) of the housing (12) at the one end of the bushing (14).

2. The sealing arrangement according to claim 1, wherein the seal element is L-shaped in cross-section and a section of the sealing element (28) superimposes the collar (24) in the radial direction (32).

3. The control device (10) according to claim 1, wherein the sealing element (28) is in the form of a sealing ring (28).

4. An exhaust gas turbocharger with a control device (10) and a sealing arrangement for the control device (10) for operating a valve (36) of the exhaust gas turbocharger disposed in a housing (12), the control device (10) including an operating shaft (16) rotatably supported in an opening of the housing (12) via a bearing bushing (14) which extends only partially through the opening of the housing (12) so as to provide at one end of the bushing (14) an area (22) in which an operating shaft collar 24) collar (24) with a circumferential groove (26) is arranged and a seal element (28) is disposed between the operating shaft (16) and a surrounding wall area of the opening adjacent the bushing (14) for sealing the operating shaft (16) directly against the surrounding wall of the opening in the area (29) of the housing (12).

* * * * *